MINIATURIZED MODULE INTERCONNECTION

Filed July 31, 1962 2 Sheets-Sheet 1

Inventor
CLETUS G. McDONOUGH
By John Todd
Attorney

MINIATURIZED MODULE INTERCONNECTION

Filed July 31, 1962 2 Sheets-Sheet 2

Inventor
CLETUS G. McDONOUGH
By John Todd
Attorney 3,212,047
MINIATURIZED MODULE INTERCONNECTION
Cletus G. McDonough, Elmhurst, Ill., assignor to United-Carr Incorporated, a corporation of Delaware
Filed July 31, 1962, Ser. No. 213,731
2 Claims. (Cl. 339—17)

The present invention relates to an electrical connector and more particularly it relates to an improved miniaturized module interconnector adapted to electrically interconnect a plurality of micro-modules in stacked, unitized relation.

With the development of the transistor a general trend developed in the electronics industry to further reduce the over-all size of electronic components to parts comparable in size to the transistor. The miniaturization trend was and is directed to a reduction in the size of the individual component parts of an electronic assembly, to the realization of greater volumetric efficiency associated with assembly of these parts into a module, and to volumetric efficiency in assembly of the modules. Each of these objects was further directed to an increase in the packaged parts density in the electronic component; that is, a reduction in the parts of air to the parts of active electronic components.

One of the major achievements toward the goal of miniaturization resides in the development of the micro-module which is smaller and lighter than conventional electronic equipment. A micro-module consists of a number of wafer-like micro-elements, which are stacked and interconnected into a unitized electronic component adapted to perform a specific function or functions.

Micro-modules may be packaged in similar shapes for additional convenience. Some modules measure only 0.3 inch on a side. Appropriate micro-elements are arranged according to the desired circuit function as, for example, an oscillator, amplifier or other stage, and are encased in a suitable dielectric in a permanent installation thereby losing their individual identity as separate components and defining only a functional unit. The resultant component is a small, shaped solid which is actually a complete aggregate, ready to function as an oscillator, amplifier, filter, counter, or the like. The modules are equipped with minute leads extending from the main body portion thereof, so that a number of modules can be connected in combination to provide a variety of circuits for radio transmitters and receivers, audio amplifiers, and the like. The resultant component may be reduced to approximately $\frac{1}{10}$ the size of the component assembled with conventional size resistors, capacitors, inductors, etc., and to this extent the miniaturization is realized.

The cost of the micro-modules has proved to be so low that notwithstanding the fact that when the individual circuit components are sealed into the dielectric to form a permanent module, they still can be replaced at less cost than it would be to repair them. Thus when a defective module is detected, it usually is simply discarded and replaced with a properly functioning module.

The advantage of the modular concept resides additionally in the fact that the micro-elements are manufactured with standard dimensions instead of the bulk shape of the conventional components. The standard shape of the functional module permits compact grouping of modules making up the sub-assemblies and equipment with additional volumetric efficiency realization.

The micro-elements are assembled, as noted hereinabove, by stacking them in accord with circuit functions and are encapsulated in micro-module configuration. The simple and uniform geometry of the module facilitates automatized fabrication and assembly.

One of the major problems in volumetric efficiency with the use of modules resides in the introduction of waste space in the module integration process. It should be observed that adequate space must be allowed for circuit connection, controls, etc., and also between the modules to accommodate the complex inter-modular wiring. Clearance space also must be allowed to remove the modules for maintenance and inspection.

In accordance with the present invention a modular socket member is provided that allows further volumetric efficiency of the component parts of the electronic assembly in that the space requirements usually reserved, as recited hereinabove, are obviated in the integration of the micro-module elements.

The frame member of the present invention connects solid state micro-module components into a small integrated, unitized assembly with maximum utilization of available space requirements and with protection of module leads. Extraneous interconnecting leads are not required with the frame member disclosed herein and to that extent considerable space may be saved.

The frame member is constructed so that the interconnecting leads are integrally associated therewith within the peripheral confiners of the member, each of the leads adapted to interconnect the stacked assembly in whatever predetermined manner required for functional assembly of the plurality of mirco-modules. Intermodular connections are made by plugging one modular assembly into the next succeeding modular assembly to provide the functional circuitry required without the conventional requirements for soldering the interconnecting leads to a bus bar or the like.

It is, accordingly, a general object of the present invention to provide an improved module interconnection that permits greater volumetric efficiency.

A further object of the present invention resides in the provision of an improved module interconnection that permits easy, convenient assembly.

Another object of the present invention lies in the provision of an improved module interconnection that permits electrical interconnection of modules without conventional soldering of the leads of said modules in assembly.

A further object of the present invention resides in the provision of an improved module interconnection that permits electrical connection of a plurality of modules by merely plugging one module assembly into stacked relation with another to provide the functional unit.

Still another object of the present invention resides in the provision of an improved module interconection that provides definite, efficient electrical contact of the module leads to the interconnector assembly and to the adjacent components of the stacked assembly.

The novel features which I believe to be characteristic of my invention are set forth with particularity in the appended claims. My invention itself, however, together with further objects and advantages thereof, will best be understood by reference to the following description taken in connection with the accompanying drawings, in which:

Figure 1:
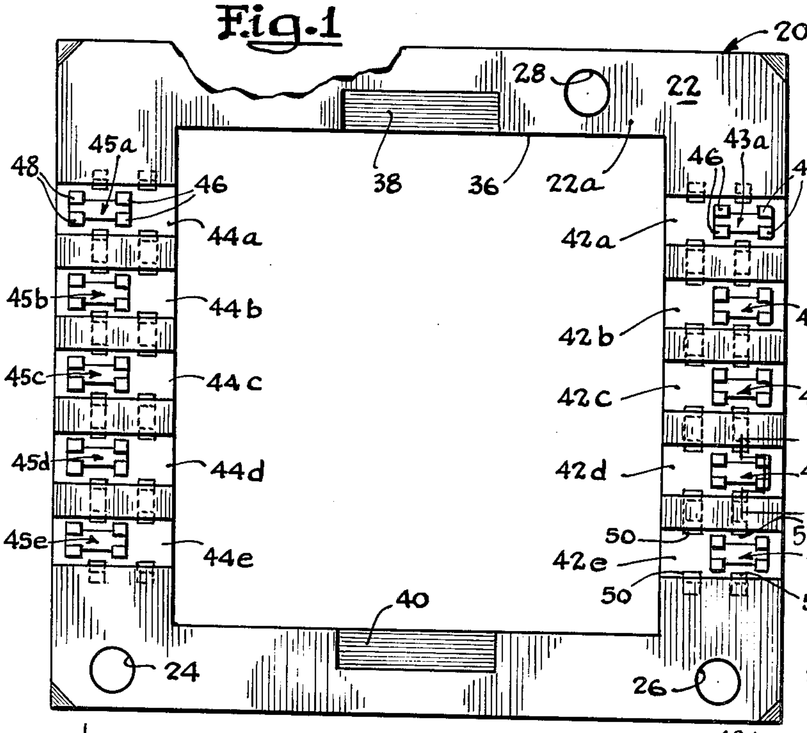
FIGURE 1 is a top plan view of the frame member of the present invention.
Figure 2:
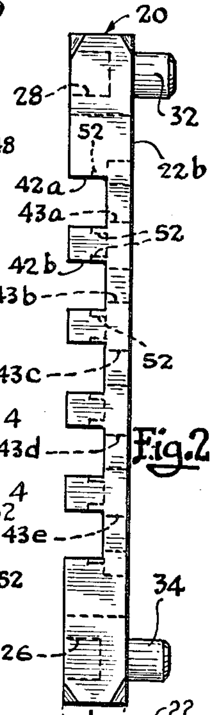
FIGURE 2 is a side view of the frame member of FIGURE 1 illustrating the recesses along the side thereof.

Referring more particularly now to FIGURES 1 and 2, the frame member of the present invention is illustrated generally at 20. The main body 22 of the frame member is of a suitable dielectric insulating material such as Bakelite, or the like. The insulating body 22 is provided with a plurality of openings 24, 26 and 28, which openings extend partially through said body 22 and terminate short of the opposite face of the main body 22 as illustrated more clearly in FIGURE 2. The openings 24, 26 and 28 are provided in the top face **22*a* of the main body 22. Face 22*b* of the main body 22 is provided with projections in mating relation to the openings 24, 26 and 28 on the top face 22*a* of the frame member 20, two of said projections 32 and 34 being illustrated in FIGURE 2. Only three openings are provided and three mating projections so as to assure proper assembly of one frame member-module assembly with adjacent assemblies. Further assurance of proper assembly is achieved through offset of opening 28 and the mating projection 32**.

A central opening 36 is provided in the frame member 20, said opening being adapted to receive the module in snug relation therein. It should be observed that the thickness of the frame member 20 is substantially the same as the thickness of the standard sized module to be inserted in the opening 36 and to this extent the assembly of the module and frame member will provide coplanar faces, respectively, with face **22*a* and 22*b***.

Sloping cutouts 38 and 40 are defined in the frame member 20 and extend from approximately the midpoint of thickness of the central opening 36 of the socket 20 upwardly to the top face **22*a* of the frame member. The sloping portions 38 and 40 are adapted, as described hereinbelow, to provide convenient access to the modules to facilitate removal thereof from the frame member 20**.

As illustrated in FIGURE 1, a plurality of recesses **42*a*, 42*b*, 42*c*, 42*d*, and 42*e* are defined at spaced intervals along one leg of the frame member 20. Additional recesses 44*a*, 44*b*, 44*c*, 44*d*, and 44*e* are provided along the opposite leg of the frame member 20, as illustrated. It should be observed that a sufficient number of recesses in the proper spacing are provided upon the frame member 20 to facilitate electrical interconnection of the leads extending from the modules (noted hereinbelow). The leads will extend from the modules at predetermined intervals along the side portions thereof and as such will facilitate standardization of manufacture of the frame members 20**.

Each of the recesses **42*a–e* and 44*a–e* has an opening extending therethrough as illustrated at 43*a–e* in FIGURE 2. Each of the openings 43*a–e* is further defined by oppositely disposed sloping shoulder portions 46 and 48, as shown in FIGURE 1. These opposite sloping shoulder portions extend downwardly from each corner of the openings into the body of the opening and terminate at a point slightly below the base of each of said recesses. The recesses 44*a–e* likewise are provided with openings 45*a–e*, respectively, extending therethrough, said recesses being defined in the same manner as those described in conjunction with 43*a–e* having inboard sloping shoulder portions 46 at the inboard corners of the opening 45*a–e* and outboard sloping shoulder portions 48 at the corners of openings 45*a–e***.

A pair of retaining shoulders 50 are provided on the walls of the inboard portion of the recesses **42*a–e* and 44*a–e*, respectively, and outboard retaining shoulders 52 are defined in the walls of the recesses 42*a–e* and 44*a–e*** adjacent the outer terminal of each of said recesses.

Figures 3, 4, 5:
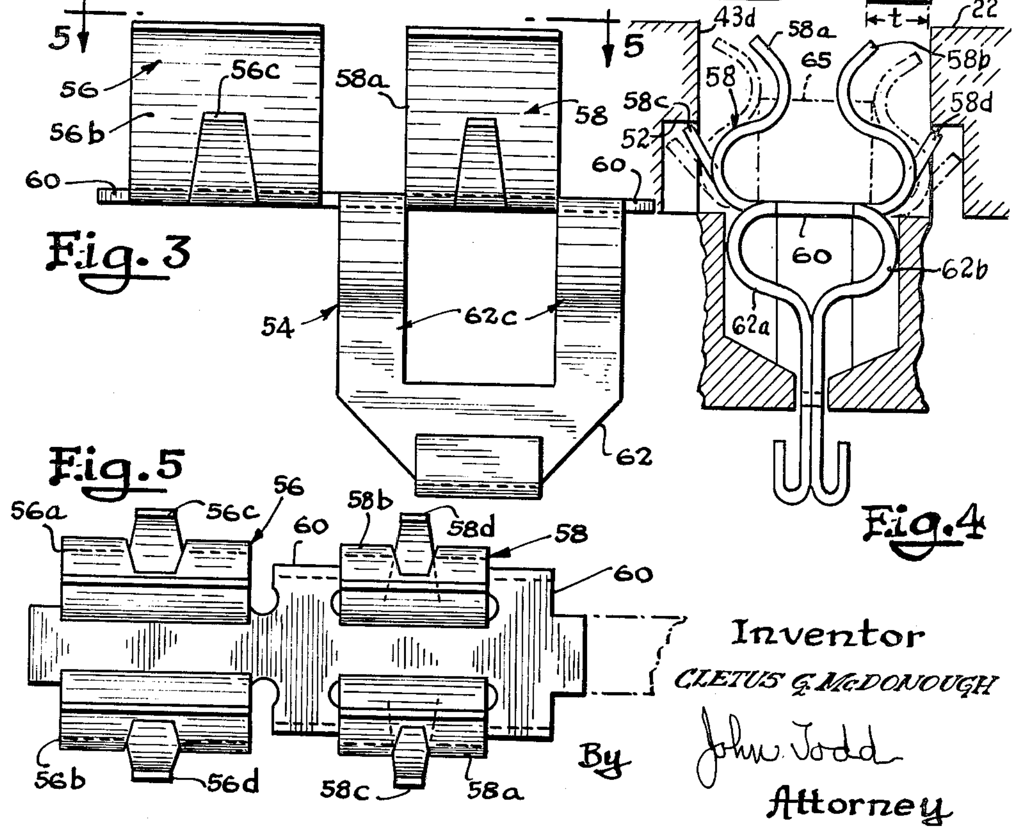
FIGURE 3 is a side elevation of the contact element which is adapted to be received within the recesses along the sides of the frame member.
FIG. 4 is a sectional view taken along the line 4—4 of FIG. 1, the contact element being shown in full.
FIGURE 5 is a top view of the contact element of FIGURE 3.

The contact element of the assembly of the present invention is indicated generally at 54, FIGURE 3. The contact element 54 preferably is formed from a continuous metal blank of a suitable electrically conductive material, such as copper, or the like. As shown FIGURES 3, 4, and 5, the contact element is defined by a pair of female contact portions 56 and 58, a base member 60 common to both female portions and a male contact portion 62 extending away from said female portions on the opposite side of said female portions.

The female portion 56 is formed by bending the ears **56*a* and 56*b*, which originally lay in the same plane as the base member 60, upwardly until each defines the generally S-shaped conformation illustrated in conjunction with FIGURE 4. Tabs 56*c* and 56*d* are stamped and bent outwardly and away from each of the S-shaped ears 56*a* and 56*b***, respectively.

The ears **62*a* and 62*b* defining the male portion 62 are bent downwardly and away from the base member, said joined portion extending along substantially the remainder of the length of the ears. The terminal of each of the ears 62*a* and 62*b* is bent upwardly to define a U-shaped portion at the lower terminal of the male portion 62** defined thereby.

The female portion 58 is stamped from the central area of the male portion 62 to thereby leave a central opening **62*c* in the male portion 62. Female portion 58 is defined by the ears 58*a* and 58*b*. Each of the ears 58*a* and 58*b* is formed into the S-shaped conformation illustrated in FIGURE 4. Tabs 58*c* and 58*d* are stamped and bent outwardly and away from each of the S-shaped ears 58*a* and 58*b***, respectively.

The contact element 54 is assembled with respect to the insulating body 22 by insertion of the male portion 62 into the openings **43*a–e* and 45*a–e*, each defined in the recesses 42*a–e* and 44*a–e*, respectively, of said body. The contact eleemnt 54 is positioned within each of the recesses in the insulating body so that the female portion 56 is inboard of the recess and lies adjacent the central opening 36 of said insulating body. The male portion 62 of the contact element 54 is urged downwardly into the recesses until the tabs 56*c* and 56*d* and 58*c* and 58*d* pass under and engage the recesses or shoulder portions 50 and 52, respectively. The bulbous portion of the male portion 62 adjacent the base member 60 prevents continued insertion of the contact element 54 into the recesses and thereby defines the downward stop for said element. The tabs 56*c–d* and 58*c–d*, when engaged in the shoulder portions of recesses 50 and 52 as defined hereinabove, define the upward stop to prevent withdrawal of the contact elements from the openings once they are inserted therein. The contact elements 54** are thus locked within the opening and thereby within the recesses.

The contact elements 54 are in the form of fuse clip members. In the form shown the contact elements present high pressure loading, definite, efficient electrical contact between the contact element portions and the electrical leads to be inserted therein.

Figures 6, 7, 8, 9, 10, 11:
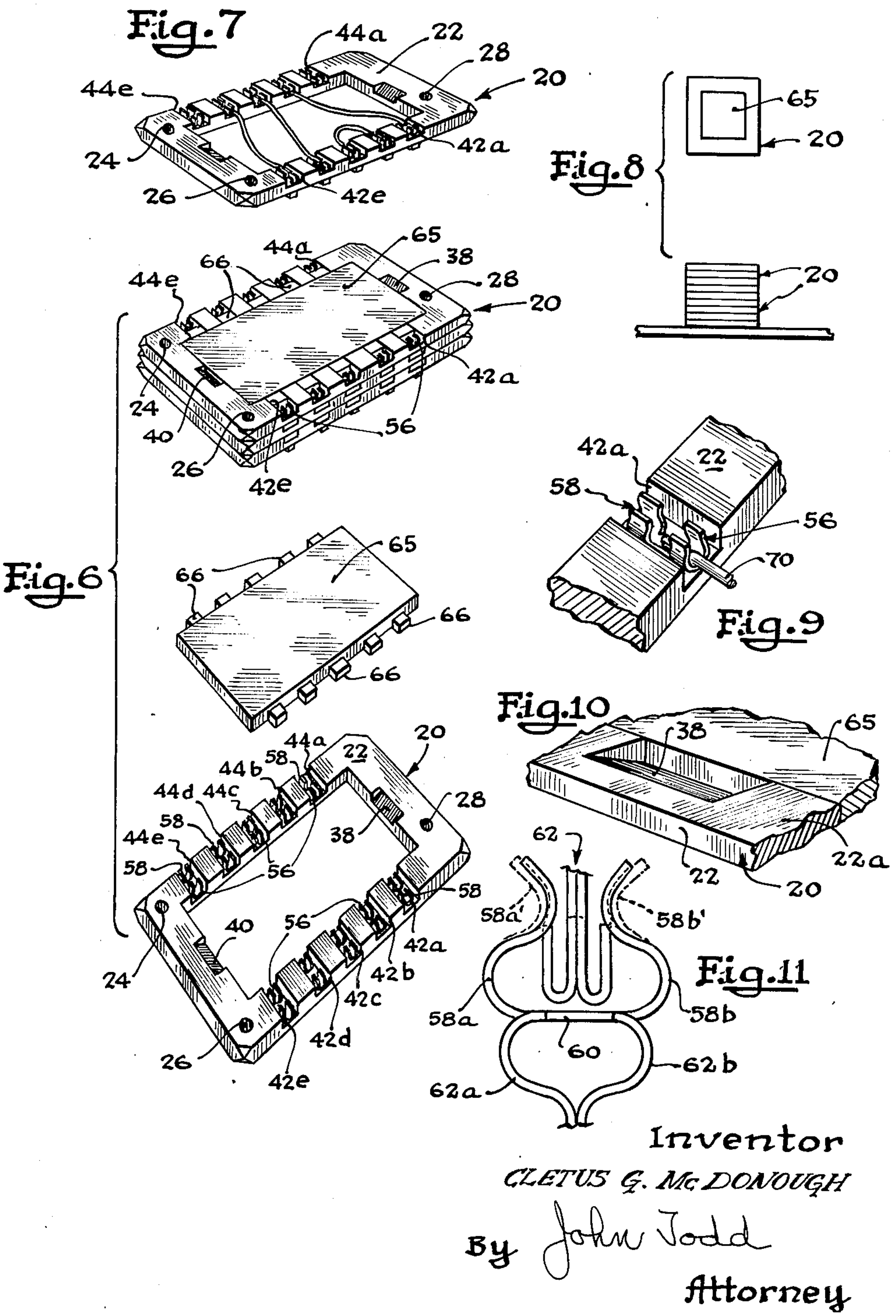
FIGURE 6 is an exploded view of a stacked assembly employing the module assemblies of the present invention.
FIGURE 7 illustrates the use of a frame member of the present invention to provide inter-modular connection by connecting electrical leads to appropriate terminals of the frame member to which the succeeding modular assemblies will be attached.
FIGURE 8 is a schematic representation of a stacked module assembly.
FIGURE 9 is a fragmentary view illustrating a modification of the present invention.
FIGURE 10 is a fragmentary view of one side of the frame member illustrating the recess to facilitate removal of the modules from the socket member; and, FIGURE 11 is an end view of portions of mating contacts of adjacent frames illustrating interengagement of the contacts.

As shown in the exploded view of FIGURE 6, the micro-modules 65 are "plugged" into the frame assembly of the present invention by simply urging each of the leads 66 of the module 65 into the female contact portions 56 of each of the mating contact elements 54. As illustrated in the dashed lines of FIGURE 4, the ears of the contact elements are spread in resilient fashion by entry of the leads into the area defined by said ears and provide efficient electrical contact therebetween while at the same time defining suitable mechanical interconnection between the leads and the female portion 56 of the contact element 54 to provide the physical condition.

The opposite faces of the module 65 when inserted into assembled relation in the frame element 20 are substantially in co-planar relationship to the faces 22*a* and 22*b*, respectively, of the insulating body. The assembled frame-module member thus presents a rigid compact unit which occupies a minimum amount of space in comparison to the components, so that a high volumetric efficiency is realized.

The frame 20 and micro-module 65 assembly may then be plugged into another assembly to define a functional unit capable of providing a predetermined circuitry.

The stacked assembly of frame and micro-module units is shown in the top illustration of the exploded view of FIGURE 6 and illustrates an assembly of three such units.

The frame members 20 are interconnected by plugging them into the next adjacent unit below said frame. The male contact portion 62 which extends below the lower face 22*b* of the socket frame 20 is adapted to be received in the female contact portion 58 of the mating contact element within the lower frame member, as illustrated in FIGURE 11. As indicated in FIGURE 11, the male contact portion 62 upon insertion into the female contact portion 58 of the contact element 54 serves to spread the ears 58*a* and 58*b* of the contact element 58 from their static position to the positions defined at 58*a'* and 58*b'* wherein they are resiliently urged outwardly by the upturned terminal portions of the ears 62*a* and 62*b* of the male contact portion. The fuse clip-type interconnection provides efficient physical and electrical connection between the mating contact element of adjacent frame members.

The electrical path may then be defined from the electrical lead of one micro-module to the female contact portion 56 of the first frame member, along the base 60 between the female contact portions to the male contact portion 62 and thence to the female contact portion 58 of the second frame member along the base 60 of the contact element of the frame socket member to the female contact portion 56 thereof and then to the electrical lead of the micro-module contained within the second frame member. This electrical path, of course, may be varied but is characteristic of the general path that may be followed with the apparatus of the present invention.

Variations of the conventional electrical path defined hereinabove may be provided with an inter-modular interconnector such as that indicated in FIGURE 7. The circuit variation may be achieved by inserting a blank frame into the stacked assembly which frame contains electrical leads from one contact element to another defined within the frame element and to which it is desired to electrically connect the micro-module in spaced but adjacent relation. As indicated it is readily seen that practically any functional circuit may be provided in the stack assembly shown and described herein either with the conventional assembly illustrated in FIGURE 6 (top illustration) or with the interconnector illustrated in FIGURE 7 provided in the assembly to shift the electrical path within the stack in whatever relation dictated by the design.

FIGURE 8 is illustrative of the relative size of the micro-module frame assembly of the present invention employing conventionally sized modules of 0.310″ x 0.310″ in width and depth and 0.020″ in height. The bottom view of FIGURE 8 is illustrative of the relative size of the side view of a plurality of module-frame assemblies in stacked relation to define a functional circuit arrangement. The top view of FIGURE 8 is illustrative of the top view of the module-frame assembly.

FIGURE 9 illustrates a modification of the contact element arrangement employed in the present invention. As indicated the contact element 54 is provided with a pair of female contact portions 56 and 58 as hereinabove defined. The outer contact portion 58 may be provided with a weld tab 70. The weld tab may be fitted therein in the same fashion as the male contact portion is received by the portion 58 or it may be rigidly attached to the portion 58 by soldering therein, for example, or it may be an extension of the blanked base member 60. The weld tab 70 is adapted to extend outwardly beyond the edge face of the frame element 20 to provide a terminal for the connection of auxiliary electrical leads thereto if such arrangement is essential.

Another variation that may be realized in use of the module-frame assembly of the present invention is to sever one or more of the male contact portions 62 wherever desired to terminate the electrical path at that portion and to define a circuit along some other predetermined path.

Additionally, the module-frame assembly of the present invention may be plugged into a conventional printed circuit board or a pre-wired board to provide suitable electrical interconnection with the auxiliary circuitry.

FIGURE 10 is an enlarged fragmentary view of a portion of the frame element of the present invention illustrating the recessed portion 38 of the frame 22. It should be observed that when the module 65 is inserted into the frame 20 of the present invention with the upper and lower faces of each being in co-planar relation, the task of removal of the module from the frame becomes somewhat difficult in that, preferably, the module is adapted to fit snugly at all edges thereof with the central opening 38 of the frame 20. The recesses 38 and 40 are adapted to extend downwardly and lead into the edges of the modules 65 to permit access thereto and to allow the module to conveniently be pried or lifted out of the frame for replacement thereof.

While I have shown and described a specific embodiment of the present invention, it will, of course, be understood that other modifications and alternative constructions may be used without departing from the true spirit and scope of this invention. I therefore intend by the appended claims to cover all such modifications and alternative constructions as fall within their true spirit and scope.

What I claim as new and desire to secure by Letters Patent of the United States, is:

1. A frame for interconnecting a plurality of miniaturized modules, said modules having a main body portion and a plurality of leads extending therefrom, said frame comprising:

an insulating body defining a central opening adapted to receive the main body portion of the miniaturized module;

a plurality of recesses extending along the insulating body portion of said frame in mating relation to the leads extending from the main body portion of the module, said recesses each having an opening extending therethrough; and, an electrical contact element disposed in each of said recesses, said contact element having a pair of female contact portions in spaced apart relation along the longitudinal axis of said recess, said female contact portions being electrically interconnected by a base bar common to both portions, said contact element further having a male contact portion integral with said bar and adapted to extend downwardly through the opening defined in the recess, said male contact portion being disposed in alignment with one of said female contact portions.

2. A frame for interconnecting a plurality of miniaturized modules, said modules having a main body portion and a plurality of leads extending therefrom, said frame comprising:

an insulating body defining a central opening adapted to receive the main body portion of the miniaturized module;

a plurality of recesses extending along the insulating body portion of said frame in mating relation to the leads extending from the main body portion of the module, said recesses each having an opening extending therethrough; and, an electrical contact element disposed in each of said recesses, said contact element having a pair of female contact portions in spaced apart relation along the longitudinal axis of said recess, said female contact portions being electrically interconnected by a base bar common to both portions, said contact element further having a male contact portion integral with said bar and extending outwardly therefrom in a direction opposite to that of said female contact portions, said male contact portion comprising a pair of ear elements in opposed relation, and one of said female contact portions comprising a pair of resilient ear elements in opposed relation with said ear elements of said female contact portion being taken from material of said ear elements of said male contact portion.

References Cited by the Examiner

UNITED STATES PATENTS

| | | | |
|---|---|---|---|
| 2,401,430 | 6/46 | Lake | 339—198 |
| 2,754,453 | 7/56 | Noell | 317—101 |
| 2,821,669 | 1/58 | Christian | 317—101 |
| 2,898,522 | 8/59 | Handen | 317—101 |
| 2,965,872 | 12/60 | Linn | 339—198 X |
| 3,026,494 | 3/62 | Andersen et al. | 339—17 |
| 3,107,965 | 10/63 | Solorow et al. | 339—17 X |

OTHER REFERENCES

Bender et al., Machine Design, November 1960, page 162.

ALBERT H. KAMPE, *Primary Examiner.*

JOSEPH D. SEERS, ALFRED S. TRASK, *Examiners.*